Dec. 22, 1959  ISAMU IKEUCHI  2,917,858
FISHING ROD HOLDER
Filed April 18, 1958  3 Sheets-Sheet 1
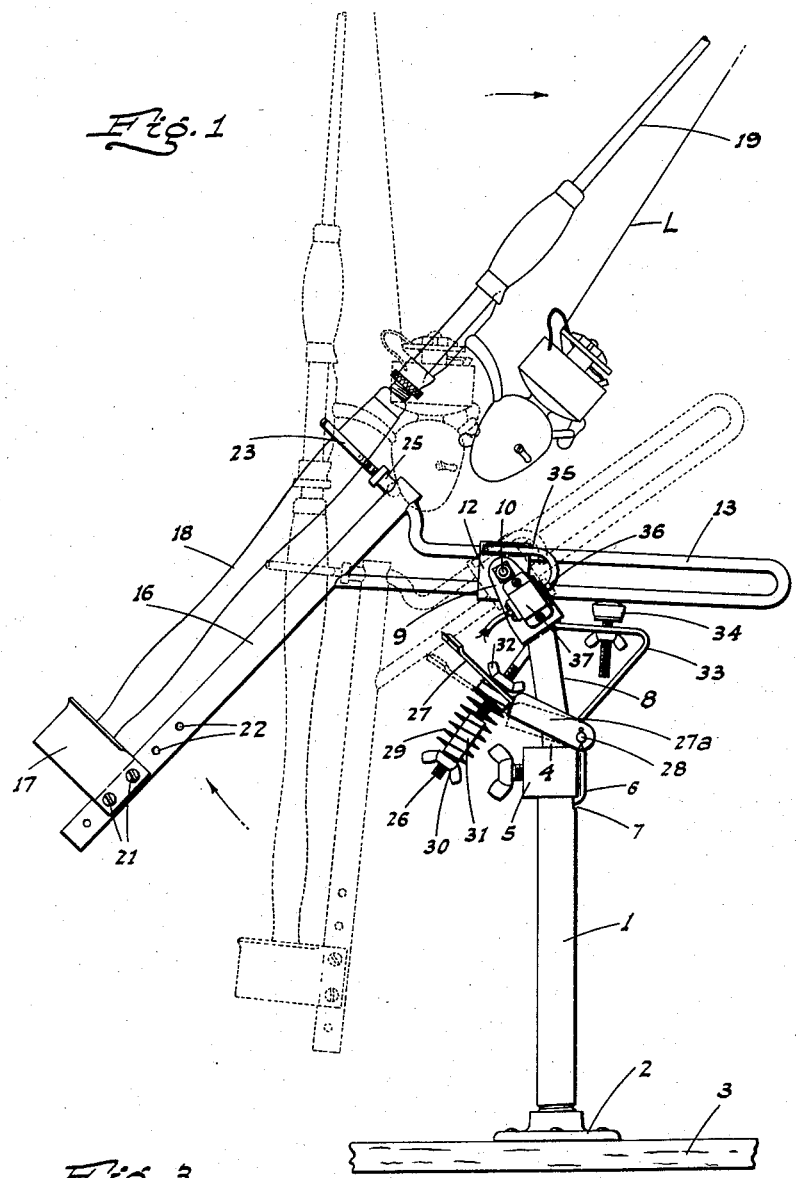
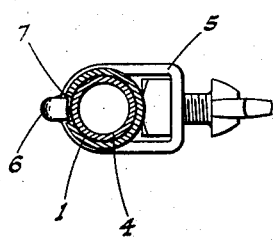
INVENTOR.
Isamu Ikeuchi
BY Webster & Webster
ATTYS.

Dec. 22, 1959 ISAMU IKEUCHI 2,917,858
FISHING ROD HOLDER
Filed April 18, 1958 3 Sheets-Sheet 2

INVENTOR.
*Isamu Ikeuchi*
BY *Webster & Webster*
ATTYS.

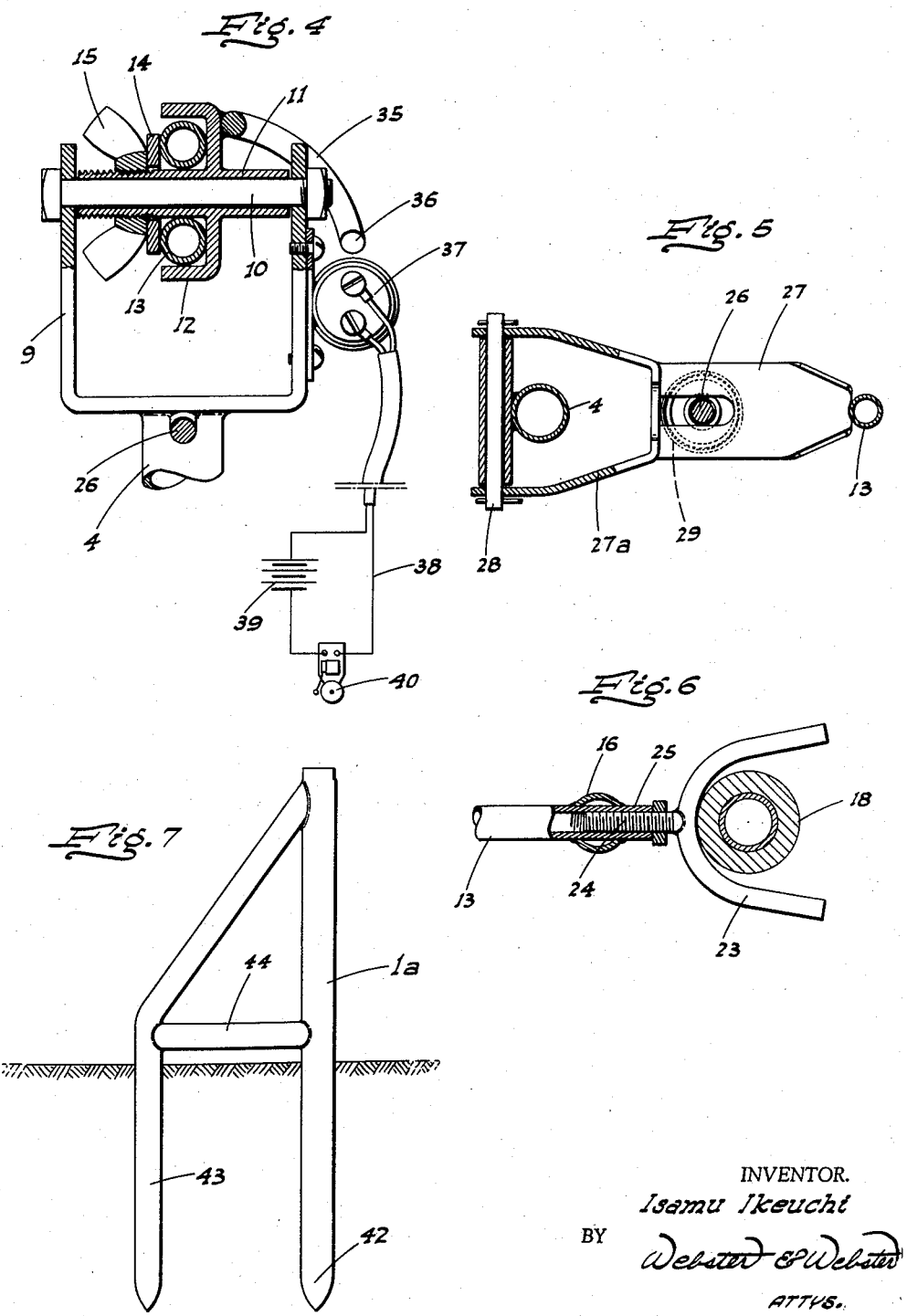

2,917,858
Patented Dec. 22, 1959

2,917,858

FISHING ROD HOLDER

Isamu Ikeuchi, Walnut Grove, Calif.

Application April 18, 1958, Serial No. 729,345

6 Claims. (Cl. 43—17)

This invention relates to a fishing rod holder adapted to be supported from a stationary member on a boat, wharf, beach, or bank, and by means of which holder an audible or visible signal will be given to the fisherman when a strike occurs.

One of the objects of the invention is to provide a rod holder for the purpose provided with adjustment means so arranged that the weight of a supported rod may be properly balanced to suit different rods and conditions, and so that a signal will not be given upon movement of the rod due to nibbles rather than an actual forceful strike by a fish.

An additional object of the invention is to provide a holder arranged so that when a fishing rod is supported in a balanced position, the holder permits the rod to play back and forth easily so as to not impose too great a tension on the line when a fish is nibbling on the bait and before the actual strike takes place; this to the end that the fish will not be scared away by undue resistance from the line and rod.

Another object of the invention is to provide the rod holder with adjustment means adapted to make the holder operative, for signal giving purposes, for fish of different kinds, sizes, and fighting qualities.

A further object of the invention is to provide a fishing rod holder which is designed for ease and economy of manufacture.

It is also an object of the invention to provide a practical and reliable fishing rod holder, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the holder with a fishing rod supported thereby, and showing the position of the rod and the structure supporting the same when a signal is being given.

Fig. 3 is a fragmentary enlarged sectional plan on line 3—3 of Fig. 2.

Fig. 4 is a fragmentary enlarged cross section on line 4—4 of Fig. 2, and including a diagram for the signal.

Fig. 5 is a fragmentary cross section on line 5—5 of Fig. 2.

Fig. 6 is a fragmentary enlarged sectional plan on line 6—6 of Fig. 2.

Fig. 7 is an elevation of a modified form of supporting standard for the rod holder.

Figure 2:
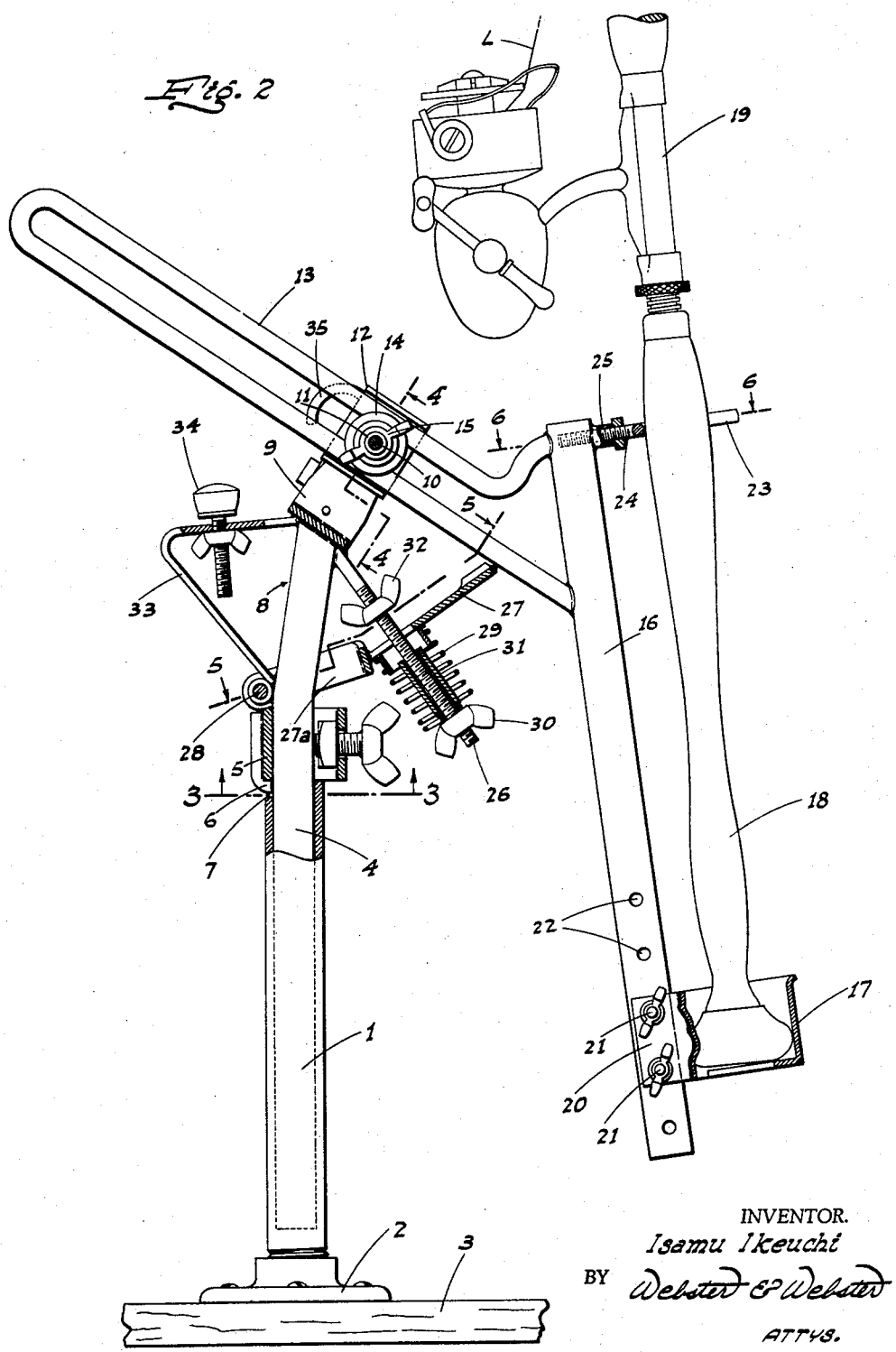
Fig. 2 is a somewhat enlarged side elevation of the holder, partly in section and looking at the side of the holder opposite that depicted in Fig. 1, and showing a supported fishing rod in a normal or slack position.

Referring now more particularly to the drawings and to the characters of reference marked thereon, and at present to the structure shown in Figs. 1–6, the improved fishing rod holder comprises a tubular standard 1 provided at its lower end with a floor flange 2 by means of which the standard may be mounted on a stationary member 3 of a boat or wharf. If desired, a detachable clamp may be used instead of flange 2.

A post 4 is turnably and slidably mounted in the standard and projects upwardly from the same; said post being held in any desired adjusted position by means of a clamping collar 5 adjustably mounted thereon and provided with a depending nub 6 engaging a notch 7 in the side of the standard at the top thereof.

The upper end portion of the post deviates from a vertical plane somewhat, as shown at 8, and on its upper end carries an upstanding fork 9, also disposed at an angle to a vertical plane somewhat greater than that of the post portion 8. Supported by the arms of the fork is a cross pin 10 on which a sleeve 11 is freely turntable, and fixed on or formed with the sleeve intermediate its ends is an open-ended, laterally facing guide yoke 12.

The rod holder per se comprises an elongated slotted member 13 which may be formed of spaced rods, as shown, and between which the sleeve 11 projects. This member—which may be considered as a swinging bar—is slidably supported by the yoke 12.

The bar 13 is held in any desired position of longitudinal adjustment in the yoke by a washer 14 on the sleeve engaging said bar on the side thereof opposite the back of the yoke; said washer 14 being advanced against bar 13, to clamp the same against the yoke, by a wing nut 15 threaded on the sleeve (see Fig. 4).

An elongated rod supporting arm 16 is rigidly secured to and depends from one end of bar 13. A cup 17 projects outwardly from the arm 16 on the side thereof opposite bar 13, and is adapted to support the lower end of the handle 18 of a fishing rod 19. The cup 17 is provided with an arm-engaging flange or slide 20, which is adjustably clamped against the arm 16 by finger-nut bolts 21 projecting through selected ones of a row of bolt holes 22 in said arm. The handle 18 is engaged at the upper end of arm 16 by a cradle 23; the fork having a stem 24 adjustably threaded into a sleeve 25 fixed on the arm 16, and which sleeve may be one of the rods of which the bar 13 is formed, as indicated in Fig. 6. This enables the angularity of the handle 18—and of the rod 19 as a whole—to be adjusted relative to the arm 16 should this be found desirable.

The weight of the rod 19 and arm 16 normally maintains the bar 13 swung at a downward slope toward arm 16, as shown in Fig. 2, and to yieldably limit the downward swinging movement of said bar the following arrangement is provided:

Rigid with, and depending from, post 4 immediately below fork 9 at an angle to post portion 8 is a threaded stem 26, which extends in the direction of the arm 16. Straddling the stem is a stop finger 27 rigid with a fork 27a which straddles the post portion 8 and is pivoted thereto on a transverse axis 28 on the side of the post opposite the stem 26, as shown in Fig. 5.

The outer end of the finger normally engages the under edge of the bar 13 at an angle of less than 90 degrees thereto, as shown in Fig. 2. A helical spring 29 surrounds stem 26 outwardly of or below the finger 27, and extends between and engages the finger and an adjustable finger nut 30 on the stem. A sleeve 31 on the stem, shorter than the normal distance from nut 30 to finger 27, limits the distance the spring can be compressed, and the movement of the stop finger in the corresponding direction.

Another finger nut 32 is mounted on the stem 26 between the finger and the post, and forms an adjustable stop, limiting movement of the finger in an upward direction.

A bracket 33 is rigid with, and projects from the portion 8 of post 4 on the side opposite the stem 26, and forms the support for a vertically adjustable cushion stop 34 which is disposed under the bar 13 to be engaged thereby upon downward swinging of the corresponding portion of said bar 13 a predetermined distance.

Fixed on, and projecting laterally out from, the back side of the yoke 12 above the pivotal pin 10, and so as to clear the fork 9, is a finger 35 (see Figs. 1 and 4). The finger 35 also projects from the yoke in a direction away from arm 16 and terminates at its outer end in a tip 36 positioned to engage and depress or close a push button switch 37 of conventional type mounted on the related side of fork 9.

Such closing of the switch is only effected after bar 13 has been swung from the normal tilted or angular position of Fig. 2 to the substantially horizontal position of Fig. 1. The switch is interposed in a normally open circuit 38 which includes a portable battery 39 and a portable signal device such as a bell 40, as indicated in Fig. 4.

The supporting standard 1 shown in Figs. 1 and 2 is designed for more or less permanent mounting.

In Fig. 7 I have shown a standard intended for removable and non-turnable mounting in a river bank or the like. In this form of the device the standard 1a proper is adapted to be driven into the ground 41 some distance, being pointed on its lower end, as at 42, to facilitate the driving. To prevent the standard from turning in the ground, a pointed ground-engaging spike 43 is disposed to one side of and parallel to the standard 1a; being rigidly connected thereto by suitable means which includes a cross bar 44 intermediate its ends which generally serves to limit the distance the spike and standard may be driven into the ground.

In operation, the fishing rod is set in connection with the supporting arm 16 so that the line L will depend from the rod in a direction to overhang the holder as a whole, or so that a strong pull on the line will tilt the bar 13 toward a horizontal signal-giving position. As a fish initially nibbles at the bait on the line, the flexible rod 19 is of course bent or deflected somewhat, but to an extent insufficient to impart any great tilting movement to the holder including the bar 13.

When a fish strikes, and imparts a sudden and heavy pulling movement to the line, the holder is swung sufficiently to cause the signal to be operated, whereupon the fisherman takes over the rod 19 and plays and lands the fish.

The bar 13 is set relative to the pivot 10 according to the type and average weight or fighting strength of the fish to be caught, since obviously the further the pivot 10 is from the arm 16 and fishing rod, the greater will be the pull on the line necessary to swing the holder about said pivot.

Regardless of the position of the bar 13 relative to the pivot 10 and the supporting post 4, a tendency to tilt the bar in the direction of its signal actuating position is always imparted to said bar by the spring-pressed finger 27; the actuating spring 29 of which may be set at different compressive strengths to compensate for or balance the holder for fishing rods of different weights.

Also, with nicety of adjustment of the spring 29, the finger 27 acts on bar 13 in a manner to attain a fine balance of the holder and supported rod, whereby the rod can easily play back and forth within certain limits and without the holder being full tilted forwardly. This is of advantage as it prevents undue tension on the line when a fish is nibbling on the bait, and which tension would tend to frighten the fish and prevent the ultimate strike.

From the foregoing description it will be readily seen that there has been produced such as device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fishing rod holder comprising a post adapted to be mounted in a fixed position, a transverse pivot pin mounted on the upper end of the post, an elongated generally horizontal bar having means at one end for the support of a fishing rod in an upstanding position, means mounting the bar intermediate its ends on the pin for swinging movement in a vertical plane, a signal actuated upon swinging of the bar a predetermined distance in one direction from an initial position, and stop means engaging the bar to prevent swinging of the bar in the opposite direction from said initial position; said stop means comprising an upwardly projecting post-supported swingable stop finger disposed under and having an end normally engaging the bar at a point between the post and said one end of the bar and at a normally acute angle to the bar, a compression spring engaging the finger opposite the post and urging the same toward said post, and means supported from the post to adjust the compression of the spring.

2. A fishing rod holder comprising a post adapted to be mounted in a fixed position, an elongated generally horizontal bar having means at one end for the support of a fishing rod in an upstanding position, means including a transverse post-mounted pivot pin supporting the bar from the upper end of the post for swinging movement about and longitudinal adjustment relative to the pin from an initial position, and a signal actuated upon swinging of the bar a predetermined distance in one direction from said initial position irrespective of the adjusted setting of the bar relative to the pivot pin.

3. A device, as in claim 2, in which the bar supporting means includes a yoke in which the bar is slidably mounted, a sleeve rigid with the yoke and turnable on the pivot pin, and means to releasably clamp the bar against the yoke.

4. A device, as in claim 2, in which the bar is longitudinally slotted and the bar supporting means includes a sleeve projecting through the slot and turnable on the pivot pin, a yoke open on one side fixed on the sleeve and supporting the bar in longitudinally slidable relation, a washer on the sleeve engaging the face of the bar at the open side of the yoke, and a clamping nut threaded on the sleeve and engaging the washer.

5. A device, as in claim 2, in which the bar supporting means includes a yoke swingable with the bar, and the signal is electric; a circuit in which the signal is interposed, a normally open push-button switch interposed in the circuit and fixed with the post, and a finger fixed with the yoke and disposed so as to engage and close the switch upon the bar swinging said predetermined distance.

6. A fishing rod holder comprising a post adapted to be mounted in a fixed position, an elongated generally horizontal bar having means at one end for the support of a fishing rod in an upstanding position, a transverse pin mounted on the upper end of the post, an electric signal, a circuit in which the signal is interposed, a switch in the circuit supported from the post adjacent the pin, a sleeve turnable on the pin, a member fixed with the sleeve for actuating the switch upon rotation of the sleeve a predetermined arcuate amount from a predetermined initial position, and means supporting the bar on the sleeve for rotation therewith and longitudinal adjustment relative thereto.

References Cited in the file of this patent

UNITED STATES PATENTS

| | | |
|---|---|---|
| 1,330,314 | Gott et al. | Feb. 10, 1920 |
| 2,502,684 | Ward | Apr. 4, 1950 |
| 2,720,048 | Bracey et al. | Oct. 11, 1955 |
| 2,740,219 | Harden | Apr. 3, 1956 |
| 2,745,088 | Bauer | May 8, 1956 |
| 2,784,517 | Mooney | Mar. 12, 1957 |
| 2,795,072 | Porter | June 11, 1957 |
| 2,816,388 | Hartley | Dec. 17, 1957 |